(12) United States Patent
Jaradi et al.

(10) Patent No.: US 11,891,005 B1
(45) Date of Patent: Feb. 6, 2024

(54) LINEAR SEAT POSITION SENSOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/164,838

(22) Filed: Feb. 6, 2023

(51) Int. Cl.
*B60N 2/00* (2006.01)
*B60R 21/015* (2006.01)
*B60N 2/07* (2006.01)

(52) U.S. Cl.
CPC ...... *B60R 21/01554* (2014.10); *B60N 2/0722* (2013.01)

(58) Field of Classification Search
None
See application file for complete search history.

(56) References Cited

U.S. PATENT DOCUMENTS

| 4,909,560 | A | | 3/1990 | Ginn | |
|---|---|---|---|---|---|
| 6,053,529 | A | * | 4/2000 | Frusti | B60N 2/002 296/68.1 |
| 6,369,689 | B1 | | 4/2002 | Osmer et al. | |
| 6,486,767 | B1 | | 11/2002 | Rainey | |
| 6,997,499 | B2 | * | 2/2006 | Tsubaki | B60N 2/0732 296/65.13 |
| 9,908,439 | B2 | * | 3/2018 | Kanehira | B60N 2/067 |
| 10,882,420 | B2 | | 1/2021 | Ricart et al. | |
| 10,919,415 | B2 | * | 2/2021 | Emrich | B60N 2/0705 |
| 10,953,771 | B2 | | 3/2021 | Faruque et al. | |
| 2003/0169033 | A1 | | 9/2003 | Tromblee et al. | |
| 2004/0017190 | A1 | | 1/2004 | McDearmon et al. | |
| 2006/0226328 | A1 | * | 10/2006 | Matsumoto | B60N 2/0843 248/429 |
| 2013/0026328 | A1 | * | 1/2013 | Ferenc | B60N 2/682 248/176.1 |
| 2016/0144746 | A1 | * | 5/2016 | Couasnon | B60N 2/0732 384/34 |
| 2018/0148011 | A1 | | 5/2018 | Zaugg et al. | |
| 2019/0143847 | A1 | * | 5/2019 | Taniguchi | B60N 2/0722 248/429 |
| 2021/0229575 | A1 | * | 7/2021 | Soga | B60N 2/073 |

FOREIGN PATENT DOCUMENTS

| DE | 102019120914 A1 * | 6/2020 | B60N 2/0228 |
|---|---|---|---|
| EP | 3112208 A1 * | 1/2017 | B60N 2/0232 |
| JP | 2015155842 A | 8/2015 | |

* cited by examiner

Primary Examiner — Steven M Marsh
(74) Attorney, Agent, or Firm — Frank A. MacKenzie; Bejin Bieneman PLC

(57) ABSTRACT

An assembly includes a track having an axis. The assembly includes a vehicle seat moveable relative the track along the axis. The assembly includes a ramp elongated along the axis. The assembly includes a linear variable differential transformer having a housing and a plunger moveably supported by the housing. The plunger contacts the ramp. The ramp being fixed relative to one of the vehicle seat or the track and the housing of the linear variable differential transformer being fixed relative to the other of the vehicle seat or the track.

17 Claims, 7 Drawing Sheets

LINEAR SEAT POSITION SENSOR

BACKGROUND

A vehicle may include amenities to allow occupants to move seats in the vehicle. The seats may be moveable within the vehicle based on several factors, e.g., size of the occupant, design parameters of the vehicle, etc. The seats may be moveable along a vehicle-longitudinal axis and along a track.

DETAILED DESCRIPTION

Figure 1:
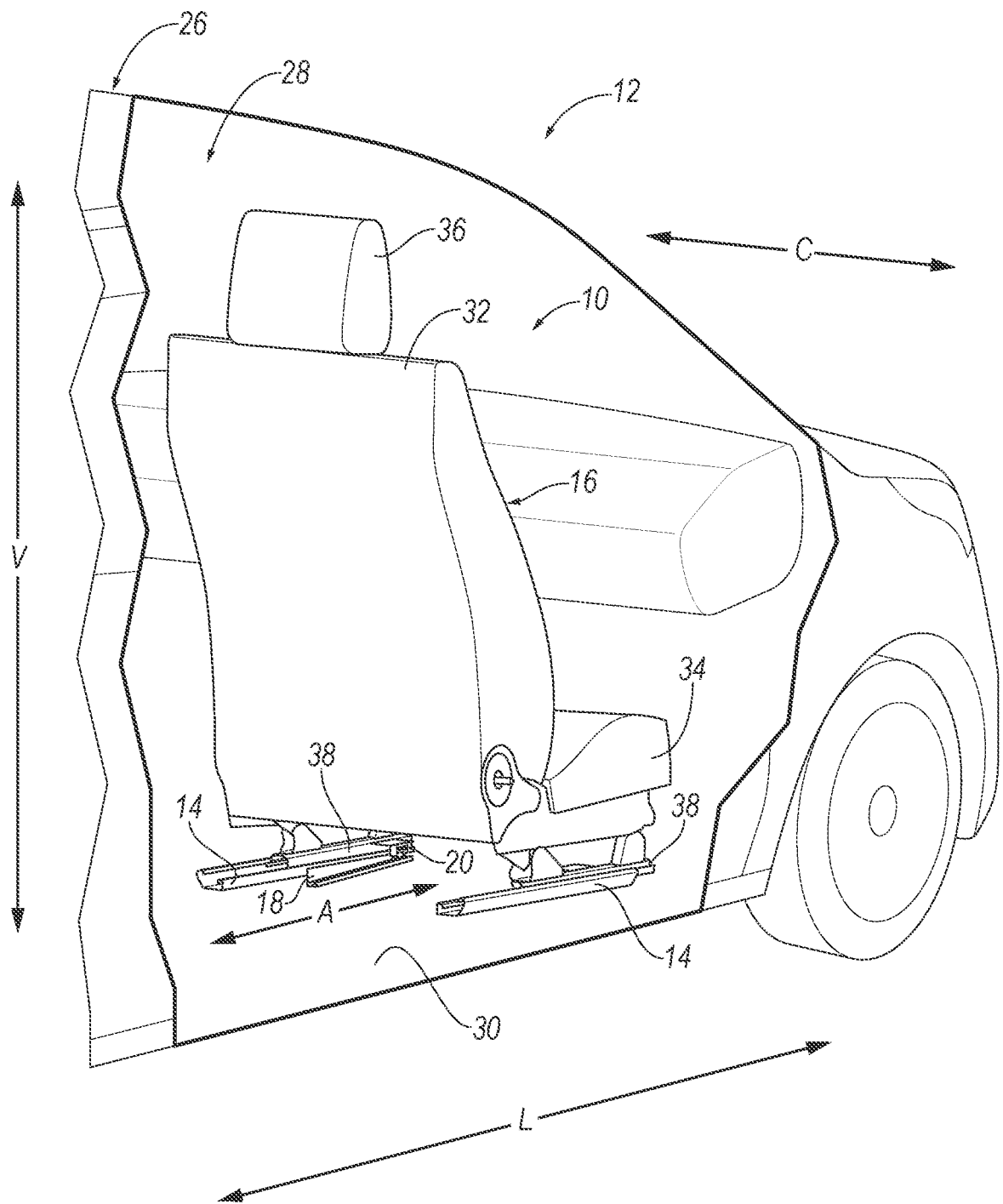
FIG. 1 is a perspective view of a seat in a vehicle.

An assembly includes a track having an axis. The assembly includes a vehicle seat moveable relative the track along the axis. The assembly includes a ramp elongated along the axis. The assembly includes a linear variable differential transformer having a housing and a plunger moveably supported by the housing. The plunger contacts the ramp. The ramp being fixed relative to one of the vehicle seat or the track and the housing of the linear variable differential transformer being fixed relative to the other of the vehicle seat or the track.

The plunger may include a rod portion and a base portion connected to the rod portion. The base portion may contact and be retained to the ramp.

The ramp may include a bottom and a first flange and a second flange spaced upwardly from the bottom. The first flange and the second flange may be spaced from each other transverse to the axis. The rod portion of the plunger may be slidable between the flanges and the base portion being slidable between the bottom and the flanges.

The base portion may contact the ramp.

The ramp may have a first end and a second end and the linear variable differential transformer is elongated along a second axis. The first end may be spaced upwardly from the second end along the second axis.

The first end of the ramp may be spaced from the track a first distance and the second end is spaced from the track a second distance shorter than the first distance.

The vehicle seat is slidable from a first position to a second position and the plunger is movable from a lowered position to a raised position. The vehicle seat may be in the first position when the plunger is in the lowered position and the vehicle seat being in the second position when the plunger is in the raised position.

The ramp may be fixed to the track.

The ramp may be fixed vehicle-inboard of the track.

The assembly may include bracket fixed relative to the vehicle seat or the track. The housing may be fixed to the bracket.

The vehicle seat may include a slider that is slidably engaged with the track. The ramp may be fixed relative to one of the slider or the track.

The assembly may include a bracket fixed relative to the other of the slider or the track.

The assembly may include a vehicle floor. The ramp may be fixed relative to the vehicle floor.

The ramp may be between the vehicle seat and the vehicle floor.

The assembly of claim 1, wherein the plunger is movable along the ramp as the vehicle seat moves relative to the track.

The plunger may be slidable relative to the ramp.

The axis may be elongated along a vehicle-longitudinal axis.

With reference to the Figures, wherein like numerals indicate like parts throughout the several views, an assembly 10 for a vehicle 12 includes a track 14 having an axis A, i.e., a first axis A. The assembly 10 includes a vehicle seat 16 moveable relative the track 14 along the axis A. The assembly 10 includes a ramp 18 elongated along the axis A. The assembly 10 includes a linear variable differential transformer 20 having a housing 22 and a plunger 24 moveably supported by the housing 22. The plunger 24 contacts the ramp 18. The ramp 18 being fixed relative to one of the vehicle seat 16 or the track 14 and the housing 22 of the linear variable differential transformer 20 being fixed relative to the other of the vehicle seat 16 or the track 14.

The vehicle seat 16 may move along the track 14 to change the linear position of the vehicle seat 16 along the first axis A. The LVDT 20 contacts the ramp 18 and the plunger 24 moves relative to the housing 22 of the LVDT 20 as the plunger 24 rides along the ramp 18. The position of the plunger 24 relative to the housing 22 indicates the linear position of the vehicle seat 16 along the track 14, as described further below. Because the plunger 24 contacts the ramp 18 and moves along the ramp 18 during any movement of the seat 16, both small and large changes in the linear position of the seat 16 may be measured by the LVDT 20. The linear position of the vehicle seat 16 may be used to, for example, operate occupant restraint systems in the vehicle 12. For example, the linear position of the seat 16 may be used to adjust seatbelt height, load limiting of restraints in certain vehicle impacts, or airbag inflation in certain vehicle impacts.

With reference to FIG. 1, the vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

With reference to FIG. 1, the vehicle 12 defines a vehicle-longitudinal axis L extending between a front end (not numbered) and a rear-end (not numbered) of the vehicle 12. The vehicle 12 defines a vehicle-lateral axis C extending cross-vehicle from one side to the other side of the vehicle 12. The vehicle 12 defines a vertical axis V extending through a vehicle floor 30 and a roof of the vehicle 12. The vehicle-longitudinal axis L, the vehicle-lateral axis C, and the vertical axis V are perpendicular relative to each other.

The vehicle 12 includes a body 26. The body 26 of the vehicle 12 defines a passenger compartment 28 to house occupants, if any, of the vehicle 12. The body 26 of the vehicle 12 includes the vehicle floor 30 disposed at the bottom 44 of the passenger compartment 28.

The passenger compartment 28 includes one or more vehicle seats 16, hereinafter referred to as seat 16 or seats 16. The vehicle 12 may include any suitable number of seats 16 in any suitable location in the passenger compartment 28, e.g., front seats, back seats, left side, right side, etc. The location and orientation of the seats 16 and components thereof may be adjustable.

The seat 16 includes a seatback 32, a seat bottom 34, and a head restraint 36. The head restraint 36 may be supported by the seatback 32 and may be stationary or movable relative to the seatback 32. The seatback 32 may be supported by the seat bottom 34 and may be stationary or movable relative to the seat bottom 34. The seatback 32, the seat bottom 34, and/or the head restraint 36 may be adjustable in multiple degrees of freedom. Specifically, the seatback 32, the seat bottom 34, and/or the head restraint 36 may themselves be adjustable, in other words, adjustable components within the seatback 32, the seat bottom 34, and/or the head restraint 36 may be adjustable relative to each other.

Figure 2A:
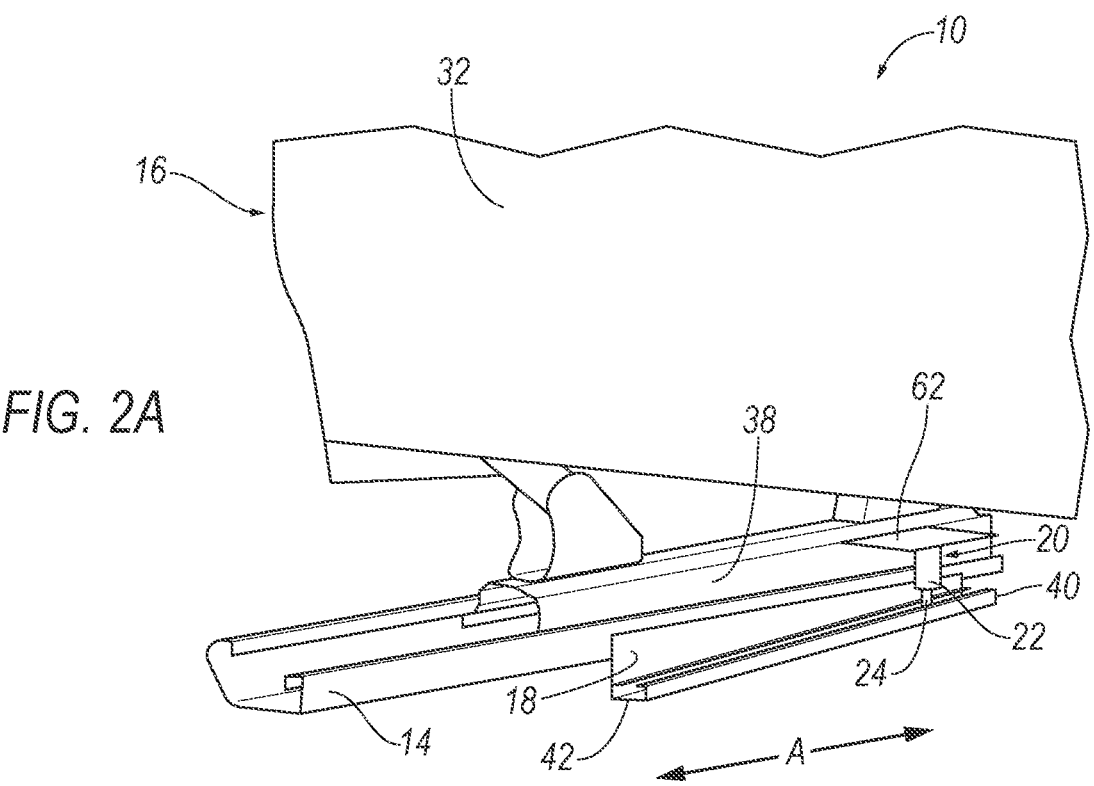
FIG. 2A is a perspective view of the seat being slidable along a track, the seat being in a first position along the track.
Figure 2B:
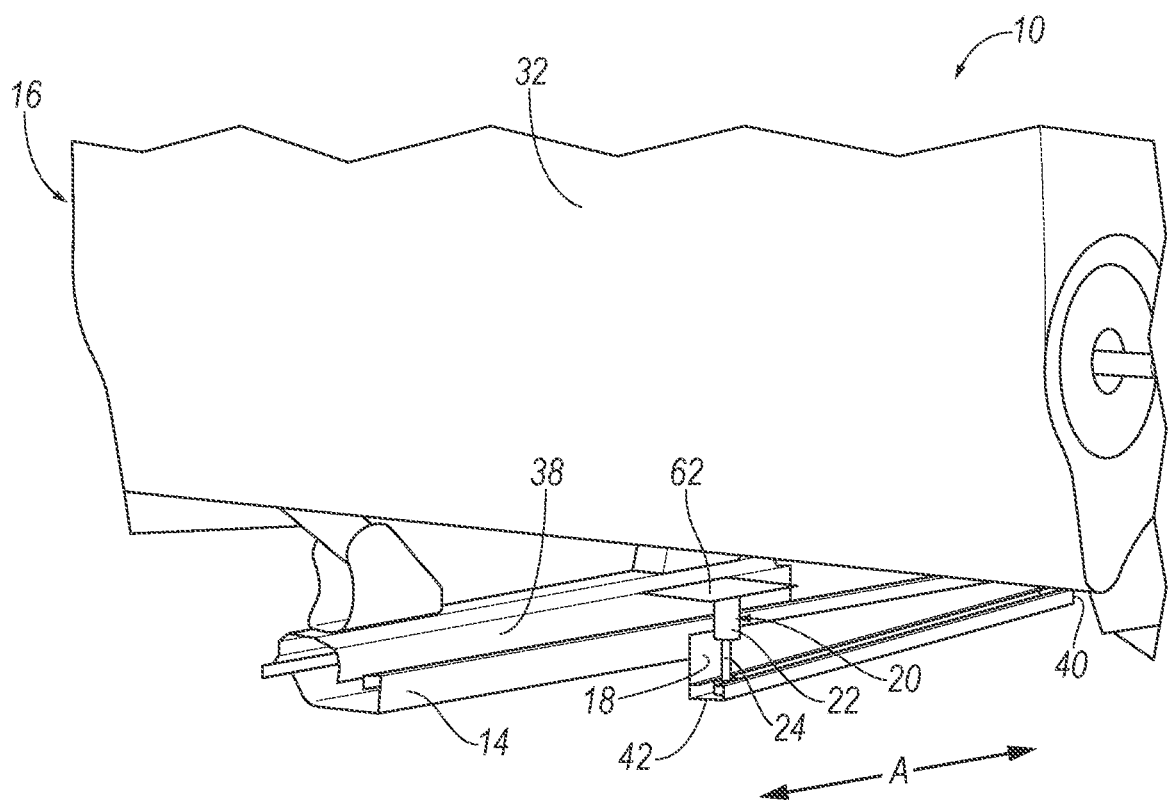
FIG. 2B is a perspective view of the seat being slidable along the track, the seat being in a second position along the track.

With reference to FIGS. 1-2B, the vehicle 12 may include one or more tracks 14 fixed to the vehicle floor 30. In the example shown in the Figures, the vehicle 12 includes a pair of tracks 14 spaced from each other. The tracks 14 are elongated along a first axis A. The track 14 may be elongated in the vehicle-longitudinal axis L, i.e., the first axis A may be parallel to the vehicle-longitudinal axis L. In such an example, the track 14 guides movement of the vehicle seat 16 along the track 14 vehicle-forward and vehicle-rearward. In other examples, the tracks 14 may be elongated in a cross-vehicle direction or any other suitable direction. The track 14 may be fixed to the vehicle floor 30 in any suitable way, e.g., welding, fasteners, etc.

As set forth above, the vehicle seat 16 is moveable along the track 14 to change the linear position of the vehicle seat 16 along the first axis A. In other words, the vehicle seat 16 is movable to different positions along the track 14, including a first position, a second position different than the first position. In some examples, the vehicle seat 16 may be moveable to a plurality of discrete positions and in other examples the adjustability may be infinite between two end positions. An example of the first position is shown in FIG. 2A and an example of the second position is shown in FIG. 2B. The first and second positions shown in FIGS. 2A-B are shown merely by way of example to illustrate two different positions.

The seat 16 is slidable relative to the vehicle floor 30 along the track 14. The seat 16 is slidably connected to the track 14 to slide the seat 16 relative to the vehicle floor 30, as described below. The seat 16 may be slidable along the track 14 to different positions, e.g., the first position and the second position.

The seat 16 may include a slider 38 that is slidably engaged with the track 14. The seat 16 is movable relative to the track 14 along the first axis A. Specifically, the slider 38 is movable relative to the track 14. The slider 38 may be releasably lockable to the track 14 so that the slider 38 and seat 16 may be adjustable along the track 14 and locked in place along the track 14 in any one of the different positions, e.g., including the first and second positions. For example, clamps, solenoids, motors, gears, etc., may be between the slider 38 and the track 14 for selectively locking the slider 38 and the track 14 relative to each other. The locking and unlocking of the slider 38 relative to the track 14, may be automated (e.g., by electro-mechanical hardware such as switches, motors, and/or solenoids, etc.), or manual (e.g., by mechanical hardware such as a lever).

The assembly 10 includes the ramp 18. The ramp 18 is fixed relative one of the slider 38 of the seat 16 or the track 14. Specifically, the ramp 18 is fixed relative to at least one of the seat 16 or the track 14. In the example shown in the Figures, the ramp 18 is fixed relative to the seat 16, the track 14, and the vehicle floor 30.

As shown in FIGS. 2A and 2B, the ramp 18 is between the seat 16 and the vehicle floor 30. Specifically, in the example shown in the Figures, the ramp 18 is fixed to the track 14. The ramp 18 may be fixed directly to the track 14. In other words, in such an example, no other components are between the ramp 18 and the track 14. The ramp 18 is elongated along the axis A from a first end 40 to a second end 42. In other words, the ramp 18 is elongated along the same direction as the track 14. The first end 40 is spaced from the second end 42 along the first axis A. In other examples, the ramp 18 may be fixed to the vehicle floor 30. The ramp 18 is fixed vehicle-inboard of the track 14. In other words, the ramp 18 may be fixed to an inboard side of the track 14. The ramp 18 may be fixed to the track 14 in any suitable way. For example, the ramp 18 may be fixed by welding, fasteners, adhesive, etc. The ramp 18 is fixed in a suitable way for the ramp 18 to remain stationary relative to the seat 16, the track 14, and the vehicle floor 30.

The ramp 18 includes a bottom 44 and a pair of flanges 46, 48, e.g., a first flange 46 and a second flange 48, spaced upwardly from the bottom 44. The first flange 46 and the second flange 48 are spaced from each other transverse to the first axis A. In other words, the first flange 46 and the second flange 48 may define a slot 50 elongated along the axis A and may be angled relative to the first axis A. In the example shown in the Figures, the slot 50 is spaced from the bottom 44. The slot 50 may be parallel to the bottom 44. The bottom 44 and flanges 46, 48 may define a channel 52 elongated along the first axis A.

The slot 50 and the bottom 44 may be at an angle relative to the track 14. In other words, the slot 50 and the bottom 44 may be angled relative to the track 14. The slot 50 and the bottom 44 may be angled to the same or substantially similar degrees. The slot 50 and the bottom 44 may be angled from the first end 40 to the second end 42. Specifically, the first end 40 of the ramp 18 is spaced upwardly from the second end 42. In other words, the ramp 18 may include an incline relative to the track 14. The first end 40 of the ramp 18 is spaced from the track 14 a first distance D1 and the second end 42 is spaced from the track 14 a second distance D2. The second distance D2 is shorter than the first distance D1. In other words, the slot 50 and bottom 44 are angled from the first end 40 to the second end 42 and the first end 40 is spaced upwardly from the second end 42.

Figure 3A:
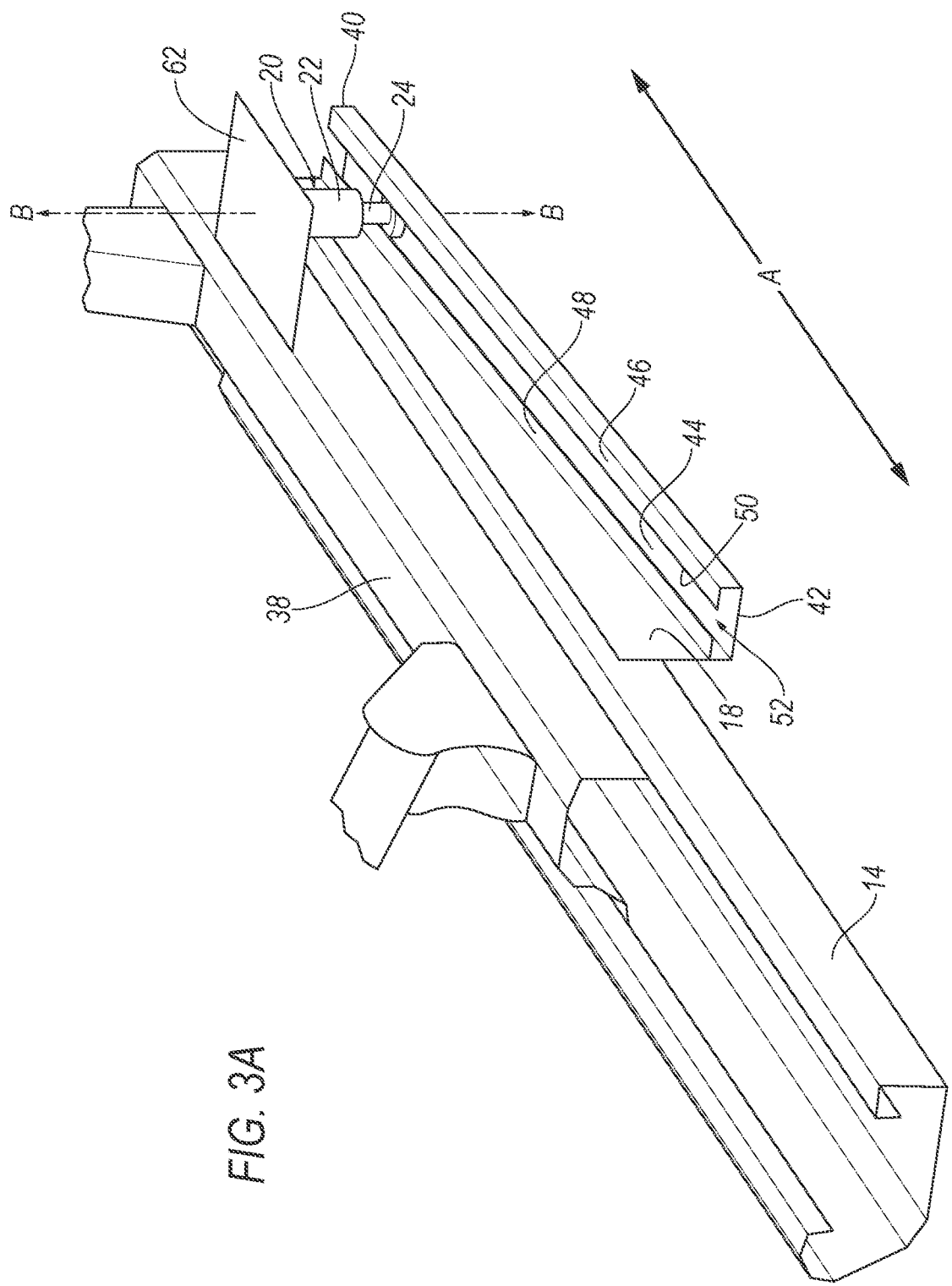
FIG. 3A is a perspective view of the track.
Figure 3B:
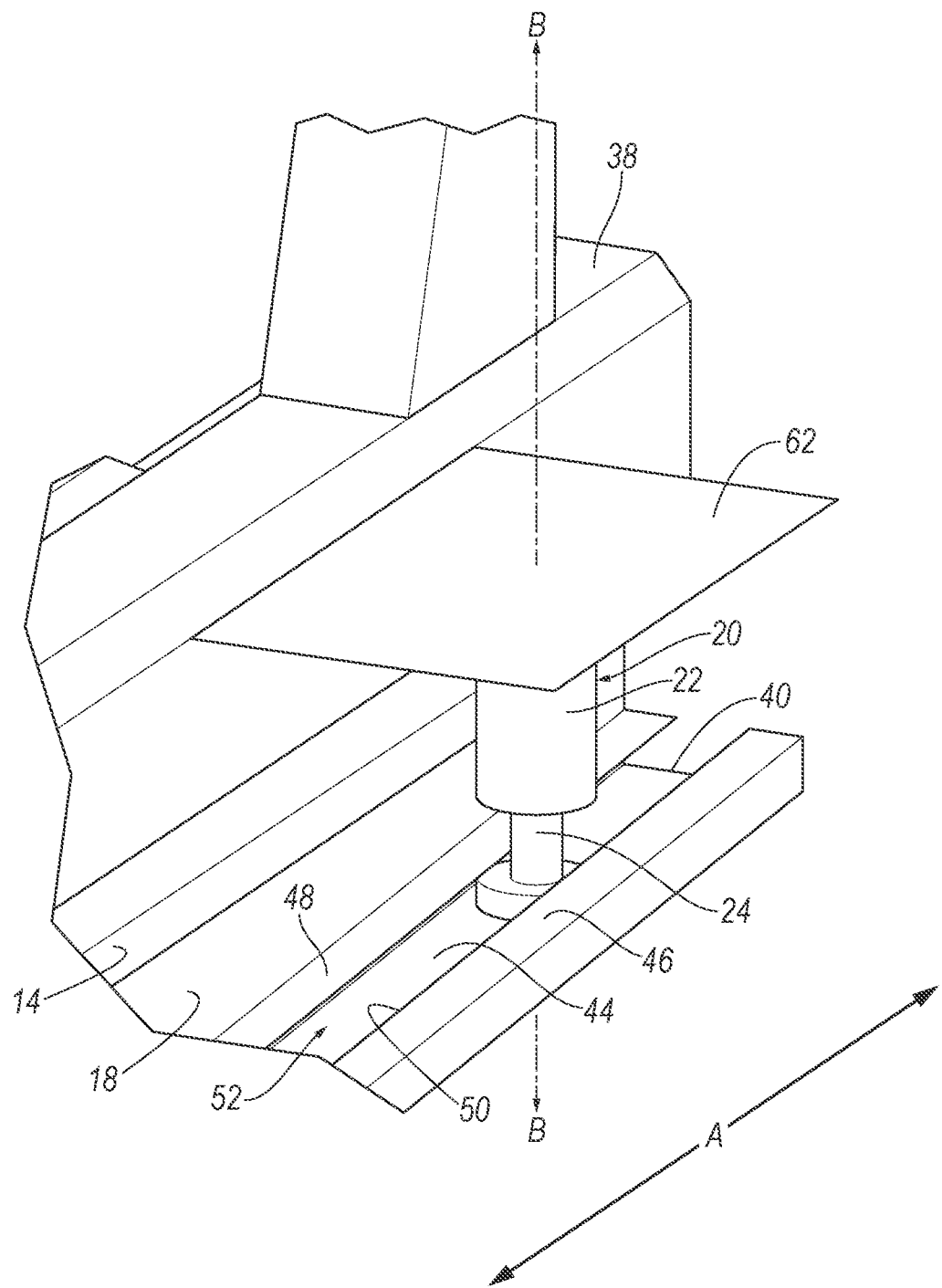
FIG. 3B is a perspective view of a linear variable differential transformer (LVDT) movable along a ramp.
Figure 5:
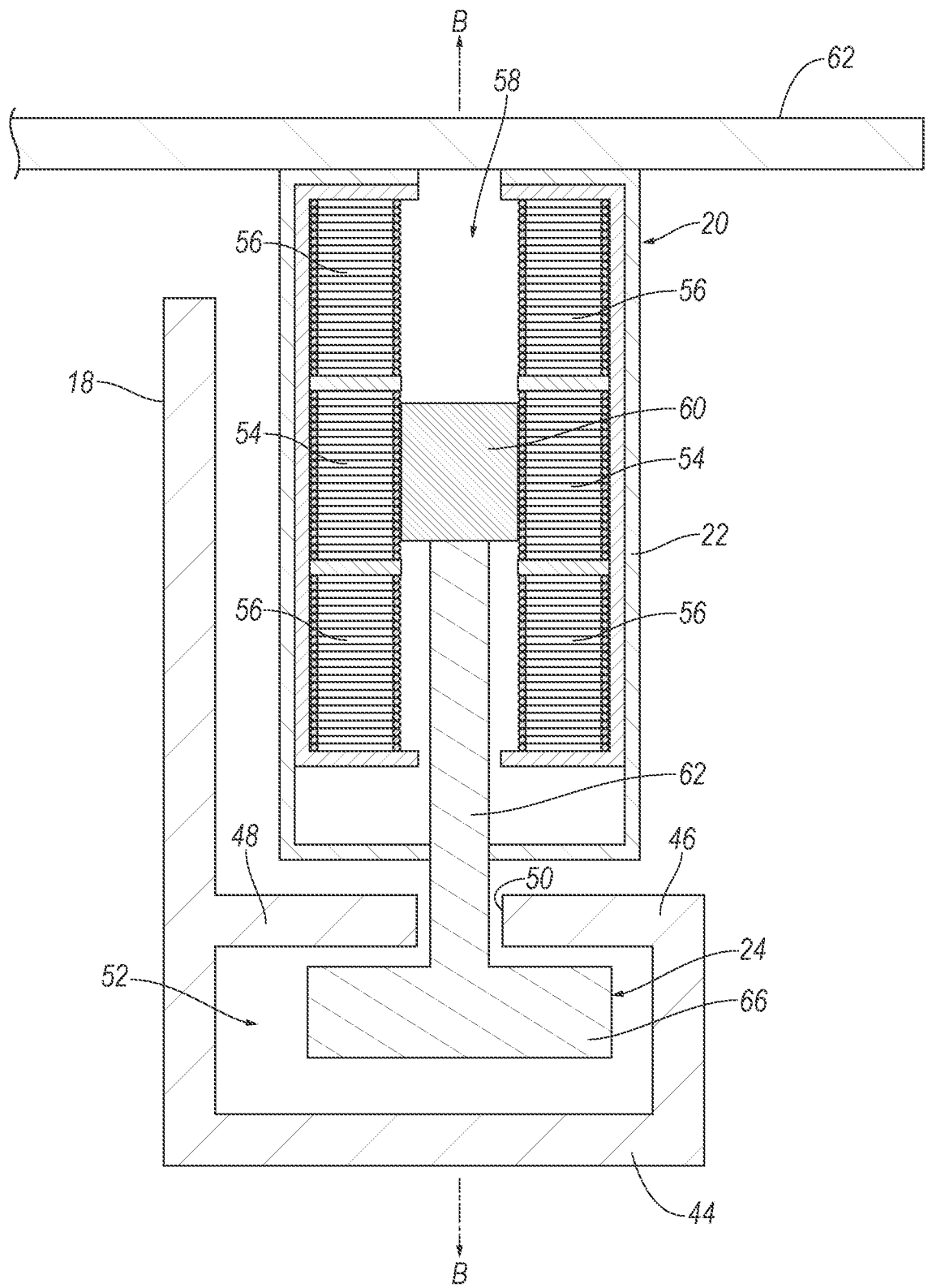
FIG. 5 is a cross-sectional view through the LVDT and the ramp.

With reference to FIGS. 3A, 3B, and 5, the assembly 10 includes the linear variable differential transformer 20 (LVDT) between the seat 16 and the track 14. The LVDT 20 includes the housing 22 and the plunger 24 that is movably supported by the housing 22. The LVDT 20 is used to determine the linear position of the seat 16 along the track 14. Specifically, the LVDT 20 may act as a sensor to determine the linear position of the seat 16 along the track 14.

The LVDT 20 extends along a second axis B. The LVDT 20 includes a primary coil 54 and a pair of secondary coils 56 disposed in the housing 22. The coils 54, 56 are stacked inside the housing 22 with the primary coil 54 positioned between the two secondary coils 56. The coils 54, 56 are concentric about the second axis B of the LVDT 20. The coils 54, 56 define a bore 58 extending along the second axis B and through the centers of the coils 54, 56. The bore 58 may be cylindrical.

The LVDT 20 includes a core 60 disposed in the bore 58. The core 60 is moveable axially along the bore 58 along the second axis B. The core 60 may be attached to the plunger 24 to move within the bore 58 as the plunger 24 slides along the ramp 18, as described further below. The core 60 is in a neutral position when the core 60 is spaced equidistantly between the top and the bottom 44 of the housing 22, i.e., the core 60 is aligned with the primary coil 54 when in the neutral position.

Deviation of the core 60 from the neutral position is measured to determine the position of the plunger 24. Specifically, the core 60, the primary coil 54, and secondary coils 56 generate a magnetic field. The magnetic field is used to determine the position of the core 60 inside the bore 58. When the core 60 is at different positions in the cylindrical bore 58, a different magnetic field is generated between the core 60, the primary coil 54, and the secondary coils 56. Based on the change in magnetic field, the linear displacement of the core 60 inside the bore 58 can be determined, i.e., a linear measurement of the displacement of the core 60 from the neutral position may be determined.

The plunger 24 is attached to the core 60 of the LVDT 20. The core 60 and the plunger 24 of the LVDT 20 move together as a unit. Accordingly, the core 60 moves when the plunger 24 rides on the ramp 18. A measurement of the linear displacement of the plunger 24 may be determined based on the linear displacement of the core 60 from the neutral position. In other words, the linear position of the seat 16 along the track 14 may be determined based on the vertical position of the plunger 24 along the second axis B.

One of the LVDT 20 or the ramp 18 may move relative to the other to determine the linear position of the seat 16. As discussed further below, the plunger 24 of the LVDT 20 slides along the ramp 18 to determine the position of the seat 16 along the track 14 and ramp 18. The ramp 18 is fixed relative to one of the seat 16 or one of the tracks 14 and the LVDT 20 is fixed relative to the other of the seat 16 or one of the tracks 14 for the plunger 24 to move along the ramp 18. Specifically, the housing 22 is fixed relative to the seat 16 or one of the track 14 and the ramp 18 is fixed relative to the other of the seat 16 or one of the track 14. The LVDT 20 and ramp 18 are fixed such that one moves relative to the other. As an example and as shown in the Figures, the ramp 18 may be fixed to one of the tracks 14 and the LVDT 20 may be fixed to the seat 16. Specifically, the LVDT 20 is fixed to the slider 38 of the seat 16. The assembly 10 may include a bracket 62 fixed relative to the seat 16 or the track 14 to support the housing 22 of the LVDT 20. In the example in the Figures, the bracket 62 is fixed relative to the slider 38 of the seat 16. The housing 22 of the LVDT 20 may be fixed to the bracket 62. In other examples not shown in the Figures, the ramp 18 may be fixed to the seat 16 and the LVDT 20 may be fixed to the track 14. The LVDT 20 may be fixed to the bracket 62 in any suitable way, e.g., fasteners, welding, adhesive, etc.

In the example shown in the Figures, because the LVDT 20 is fixed relative to the seat 16, the plunger 24 is fixed relative to the seat 16. The LVDT 20 is movable relative to the ramp 18 along the first axis A as the seat 16 moves along the track 14. Specifically, the plunger 24 is movable relative to the ramp 18 when the seat 16 moves along the track 14. The plunger 24 moves along the slot 50 and channel 52 of the ramp 18 as the seat 16 moves along the track 14. In other examples not shown in the Figures, such as where the LVDT 20, i.e., the plunger 24, is fixed relative to the track 14 and the ramp 18 is fixed relative to the seat 16, the ramp 18 may be movable relative to the LVDT 20. Specifically, in such an example, the ramp 18 may be movable relative to the plunger 24 of the LVDT 20 as the seat 16 moves along the track 14.

Figure 4A:
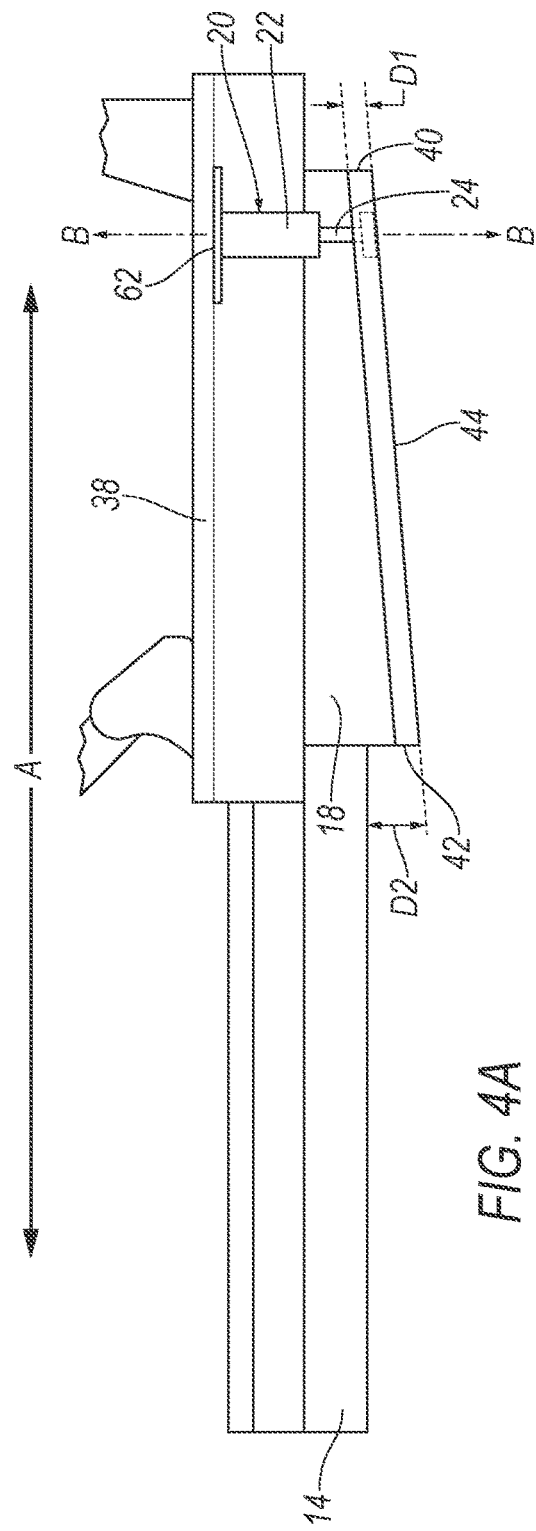
FIG. 4A is a side view of the track with the LVDT in a raised position.
Figure 4B:
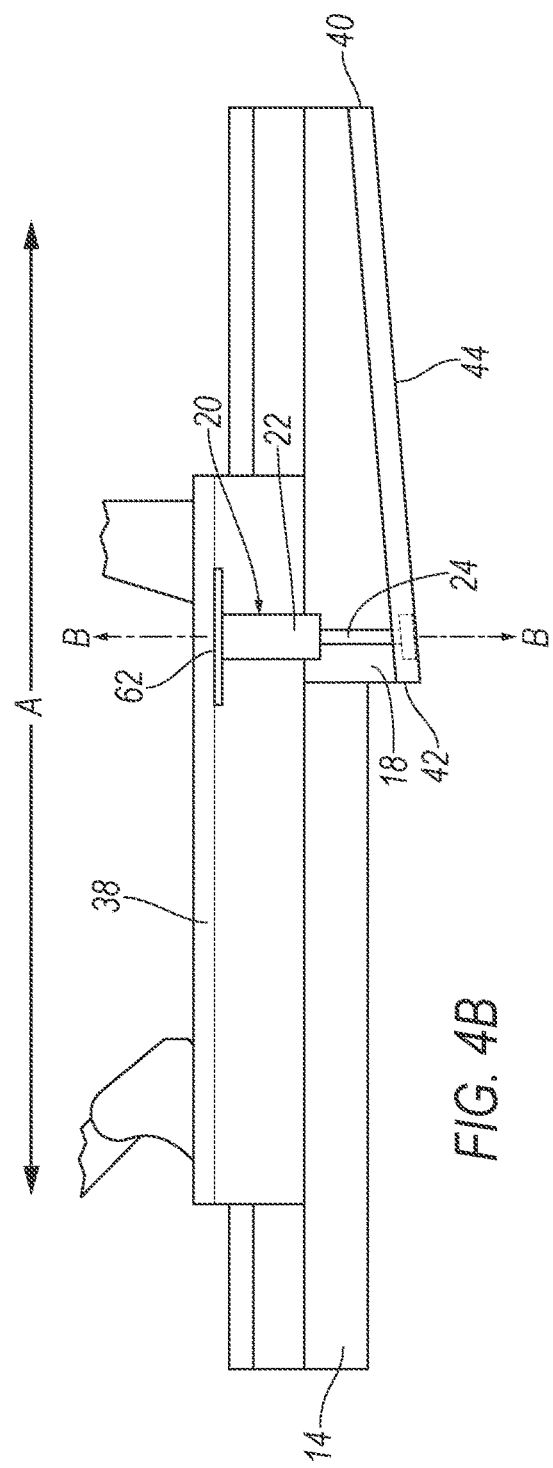
FIG. 4B is a side view of the track with the LVDT in a lowered position.

With reference to FIGS. 4A-5 and as discussed above, the plunger 24 of the LVDT 20 is movably supported by the housing 22. The plunger 24 may be movable along the second axis B in the bore 58. As the seat 16 moves between the different positions, e.g., the first position and the second position, the plunger 24 may move within the bore 58 and along the second axis B with the displacement of the plunger 24 indicating movement of the seat 16 along the track 14. As the seat 16 moves relative to the track 14, the plunger 24 contacts the ramp 18 and moves relative to the ramp 18 along the first axis A. In other words, the plunger 24 may abut the ramp 18 as the seat 16 moves along the first axis A. Because the ramp 18 is angled relative to the track 14, the plunger 24 of the LVDT 20 moves from a lowered position to a raised position in the bore 58. The first end 40 of the ramp 18 may be spaced upwardly from the second end 42 of the ramp 18 along the second axis B.

The seat 16 may be in one position, e.g., the first position, when the plunger 24 is in the raised position and the seat 16 may be in another position, e.g., the second position when the plunger 24 is in the lowered position. In other words, when the seat 16 is vehicle-forward along the track 14, the plunger 24 may be in the raised position and when the seat 16 is vehicle-rearward along the track 14, the plunger 24 may be in the lowered position. The movement of the seat 16 long the track 14 causes the plunger 24 to either move farther into the bore 58 or move in a direction out of the bore 58. The displacement of the plunger 24 in the bore 58 indicates a linear position of the seat 16 along the track 14 and first axis A.

The plunger 24 includes a rod portion 64 and base portion 66 connected to the rod portion 64. The rod portion 64 may be elongated along the second axis B and movable within the bore 58 of the housing 22. The base portion 66 may be connected to the rod portion 64 at the portion of the plunger 24 that contacts the ramp 18. In other words, the base portion 66 may contact the ramp 18. As the seat 16 moves along the track 14, the plunger 24 moves along the ramp 18 to determine the linear position of the seat 16. Specifically, the rod portion 64 of the plunger 24 is slidable between the flanges 46, 48 and the base portion 66 is slidable between the bottom 44 and the flanges 46, 48. In other words, the rod portion 64 is slidable in the slot 50 and the base portion 66 is slidable in the channel 52 of the ramp 18.

The base portion 66 contacts the ramp 18. The base portion 66 contacting the ramp 18 allows the linear position of the seat 16 to be determined along the track 14. Specifically, the base portion 66 contacts the ramp 18 in the channel 52. As the seat 16 moves along the track 14, the base portion 66 is movable along the channel 52 and contacts the ramp 18. The base portion 66 may contact the flanges 46, 48 of the ramp 18 or the base portion 66 may contact the bottom 44 of the ramp 18. Since the base portion 66 is between the bottom 44 and the flanges 46, 48, the base portion 66 is retained between the bottom 44 and the flanges 46, 48. The base portion 66 may have a circular or semicircular shape having a diameter that is larger than a width of the slot 50 but smaller than a width of the channel 52. In other words, the base portion 66 is retained in the channel 52 by the flanges 46, 48, but the base portion 66 is able to slide within the channel 52 along the first axis A as the seat 16 moves along the track 14.

The vehicle 12 may include any suitable number of LVDTs 20 to determine the linear position of one or more of the seats 16 in the vehicle 12. The example shown in the Figures includes one LVDT 20 fixed relative to the seat 16 or one of the track 14. In other examples, more than one LVDT 20 may be fixed relative to the seat 16 or both tracks 14. In such examples, one LVDT 20 may be fixed adjacent one of the tracks 14 and another LVDT 20 may be fixed adjacent the other of the tracks 14.

The vehicle computer 68 includes a processor and a memory. The memory includes one or more forms of computer readable media, and stores instructions executable by the vehicle computer 68 for performing various operations, including as disclosed herein. The vehicle computer 68 may be a restraint control module. The vehicle computer 68 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 68 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

Figure 6:
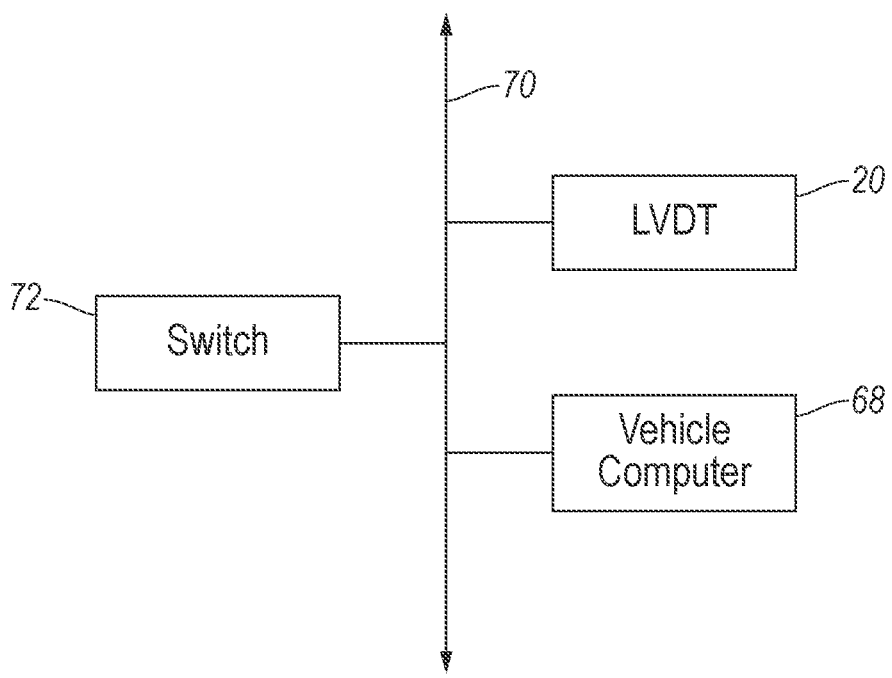
FIG. 6 is a block diagram of a vehicle communication network of the vehicle.

With reference to FIG. 6, the vehicle computer 68 is generally arranged for communications on a vehicle communication network 70 that can include a bus in the vehicle 12 such as a controller area network CAN or the like, and/or other wired and/or wireless mechanisms. Alternatively or additionally, in cases where the computer actually comprises a plurality of devices, the vehicle communication network 70 may be used for communications between devices represented as the computer in this disclosure. Further, as mentioned below, various controllers and/or sensors may provide data to the computer via the vehicle communication network 70.

The position of the seat 16 in the vehicle 12 may be adjusted by an occupant of the vehicle 12. In such an example, the vehicle 12 may include a switch 72, e.g., a switch on the seat 16, a user interface, buttons, etc., to move the seat 16 into position. In other examples, the position of the seat 16 in the vehicle 12 may be adjusted automatically by the vehicle 12. In such an example, the vehicle 12 may include sensors or stored information about the occupant to move the seat 16 into position. In both examples described above, as the seat 16 moves into position, the plunger 24 rides along the ramp 18 between the raised position and the lowered position. Based on the displacement of the plunger 24 along the second axis B as the seat 16 moves along the first axis A, the position of the seat 16 may be determined by the vehicle computer 68. The LVDT 20 may be in communication with the vehicle computer 68 over the vehicle communication network to provide the linear position of the seat 16 along the track 14. The position of the seat 16 may be used to adjust load limiting of restraints, airbag inflation, seatbelt height in the event of certain impacts to the vehicle 12. In other examples, the linear position of the seat 16 may be used in the vehicle 12 for other purposes.

The disclosure has been described in an illustrative manner, and it is to be understood that the terminology which has been used is intended to be in the nature of words of description rather than of limitation. The numerical terms "first" and "second" are used herein merely as identifiers and do not signify order or importance. Many modifications and variations of the present disclosure are possible in light of the above teachings, and the disclosure may be practiced otherwise than as specifically described.

What is claimed is:

1. An assembly comprising:
   a track having an axis;
   a vehicle seat moveable relative to the track along the axis;
   a ramp elongated along the axis; and
   a linear variable differential transformer having a housing and a plunger moveably supported by the housing, the plunger contacting the ramp;
   the ramp being fixed relative to one of the vehicle seat or the track and the housing of the linear variable differential transformer being fixed relative to the other of the vehicle seat or the track.

2. The assembly of claim 1, wherein the plunger includes a rod portion and a base portion connected to the rod portion, the base portion contacting and being retained to the ramp.

3. The assembly of claim 2, wherein:
   the ramp includes a bottom and a first flange and a second flange spaced upwardly from the bottom; the first flange and the second flange are spaced from each other transverse to the axis; and
   the rod portion of the plunger being slidable between the flanges and the base portion being slidable between the bottom and the flanges.

4. The assembly of claim 2, wherein the base portion contacts the ramp.

5. The assembly of claim 1, wherein the ramp has a first end and a second end and the linear variable differential transformer is elongated along a second axis, the first end being spaced upwardly from the second end along the second axis.

6. The assembly of claim 5, wherein the first end of the ramp is spaced from the track a first distance and the second end is spaced from the track a second distance shorter than the first distance.

7. The assembly of claim 1, wherein the vehicle seat is slidable from a first position to a second position and the plunger is movable from a lowered position to a raised position, the vehicle seat being in the first position when the plunger is in the lowered position and the vehicle seat being in the second position when the plunger is in the raised position.

8. The assembly of claim 1, wherein the ramp is fixed to the track.

9. The assembly of claim 1, wherein the ramp is fixed vehicle-inboard of the track.

10. The assembly of claim 1, further comprising a bracket fixed relative to the vehicle seat or the track, the housing being fixed to the bracket.

11. The assembly of claim 1, wherein the vehicle seat includes a slider that is slidably engaged with the track, the ramp being fixed relative to one of the slider or the track.

12. The assembly of claim 11, further comprising a bracket fixed relative to the other of the slider or the track.

13. The assembly of claim 1, further comprising a vehicle floor, the ramp is fixed relative to the vehicle floor.

14. The assembly of claim 13, wherein the ramp is between the vehicle seat and the vehicle floor.

15. The assembly of claim 1, wherein the plunger is movable along the ramp as the vehicle seat moves relative to the track.

16. The assembly of claim 1, wherein the plunger is slidable relative to the ramp.

17. The assembly of claim 1, wherein the axis is elongated along a vehicle-longitudinal axis.

\* \* \* \* \*